US008350798B2

United States Patent
Hong et al.

(10) Patent No.: US 8,350,798 B2
(45) Date of Patent: Jan. 8, 2013

(54) LIQUID CRYSTAL DISPLAY DEVICE

(75) Inventors: Hee Jung Hong, Seoul (KR); Kyung Joon Kwon, Seoul (KR); Hee Won Ahn, Gyeonggi-do (KR); Dae Ho Cho, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 556 days.

(21) Appl. No.: 12/616,190

(22) Filed: Nov. 11, 2009

(65) Prior Publication Data

US 2010/0156924 A1 Jun. 24, 2010

(30) Foreign Application Priority Data

Dec. 23, 2008 (KR) ........................ 10-2008-0132721

(51) Int. Cl.
*G09G 3/36* (2006.01)
*G06F 3/038* (2006.01)
*H05B 37/02* (2006.01)

(52) U.S. Cl. ......................... 345/102; 345/207; 315/149

(58) Field of Classification Search .................. 345/102, 345/207, 589
See application file for complete search history.

(56) References Cited

U.S. PATENT DOCUMENTS

2002/0195954 A1* 12/2002 Kim .............................. 315/149
2005/0190142 A1* 9/2005 Ferguson ...................... 345/102
2008/0186294 A1* 8/2008 Lee et al. ...................... 345/207

* cited by examiner

*Primary Examiner* — Alexander Eisen
*Assistant Examiner* — Amit Chatly
(74) *Attorney, Agent, or Firm* — Morgan, Lewis & Bockius LLP

(57) ABSTRACT

A liquid crystal display device capable of improving reliability of a backlight unit is disclosed.
The liquid crystal display device includes: a backlight dimming modulating unit configured to modulate an internal algorithm backlight dimming control signal using an external input algorithm backlight dimming control signal and to maintain a dimming duty equal to or wider than an allowable dimming range of a backlight unit; arithmetic unit configured to multiply the external input algorithm backlight dimming control signal by the modulated internal algorithm backlight dimming control signal and to output a final backlight dimming control signal; and a data modulating unit configured to modulate image data using the external input algorithm backlight dimming control signal corresponding to the modulated final backlight dimming control signal.

3 Claims, 2 Drawing Sheets

LIQUID CRYSTAL DISPLAY DEVICE

CROSS-REFERENCE TO RELATED APPLICATION

This application claims priority under 35 U.S.C. 119 to Korean Patent Application No. 10-2008-0132721, filed on Dec. 23, 2008, which is hereby incorporated by reference in its entirety.

BACKGROUND

1. Field of the Disclosure

This disclosure relates to a liquid crystal display (LCD) device, and more particularly to an LCD device which can improve reliability of a backlight unit.

2. Description of the Related Art

Recently, a variety of flat panel display devices with reduced weight and volume have been widely used in place of cathode ray tubes (CRTs). The flat panel display devices include liquid crystal display (LCD) devices, field emission display (FED) devices, plasma display panels (PDPs), and light emitting diode (LED) display devices.

Among the display devices, the LCD device displays an image by adjusting the amount of light transmitted from light generated by a rear light source. This involves using each pixel of a liquid crystal display panel as an optical valve. A cathode ray tube (CRT) of the related art controls luminance by adjusting the intensity of an electronic line. By contrast, an LCD device displays the image on a screen by controlling an intensity of light generated by a light source.

LCD devices include a liquid crystal display panel and a timing controller, as well as gate and data drivers driving the liquid crystal display panel using a timing signal provided from the timing controller.

The liquid crystal display panel includes a plurality of gate lines transferring a scan signal, a plurality of data lines formed intersecting the gate lines and transferring image data, a pixel defined by the gate lines and the data lines, and a thin film transistor formed at each intersection of the gate lines and data lines.

The LCD device further includes a backlight unit providing light.

An LCD device of the related art drives the light source of a backlight unit using an internal algorithm backlight dimming control signal and an external algorithm backlight dimming control signal.

However, upon driving the light source of the backlight unit using the internal/external algorithm backlight dimming control signals, the dimming dutycycle of the backlight unit is set below a reference for an allowable dimming dutycycle (approximately 30% or greater of a dimming dutycycle), frequently deteriorating the reliability of the backlight unit.

BRIEF SUMMARY

Accordingly, the present embodiments are directed to an LCD device that substantially obviates one or more of problems due to the limitations and disadvantages of the related art.

An object of the present embodiment is to provide an LCD device that can improve the reliability of a backlight unit.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general aspect of the present embodiment, an LCD device includes: a backlight dimming modulating unit configured to modulate an internal algorithm backlight dimming control signal using an external input algorithm backlight dimming control signal and to maintain a dimming duty equal to or wider than an allowable dimming range of a backlight unit; an arithmetic unit configured to multiply the external input algorithm backlight dimming control signal by the modulated internal algorithm backlight dimming control signal and to output a final backlight dimming control signal; and a data modulating unit configured to modulate image data using the external input algorithm backlight dimming control signal corresponding to the modulated final backlight dimming control signal.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION

Figure 1:
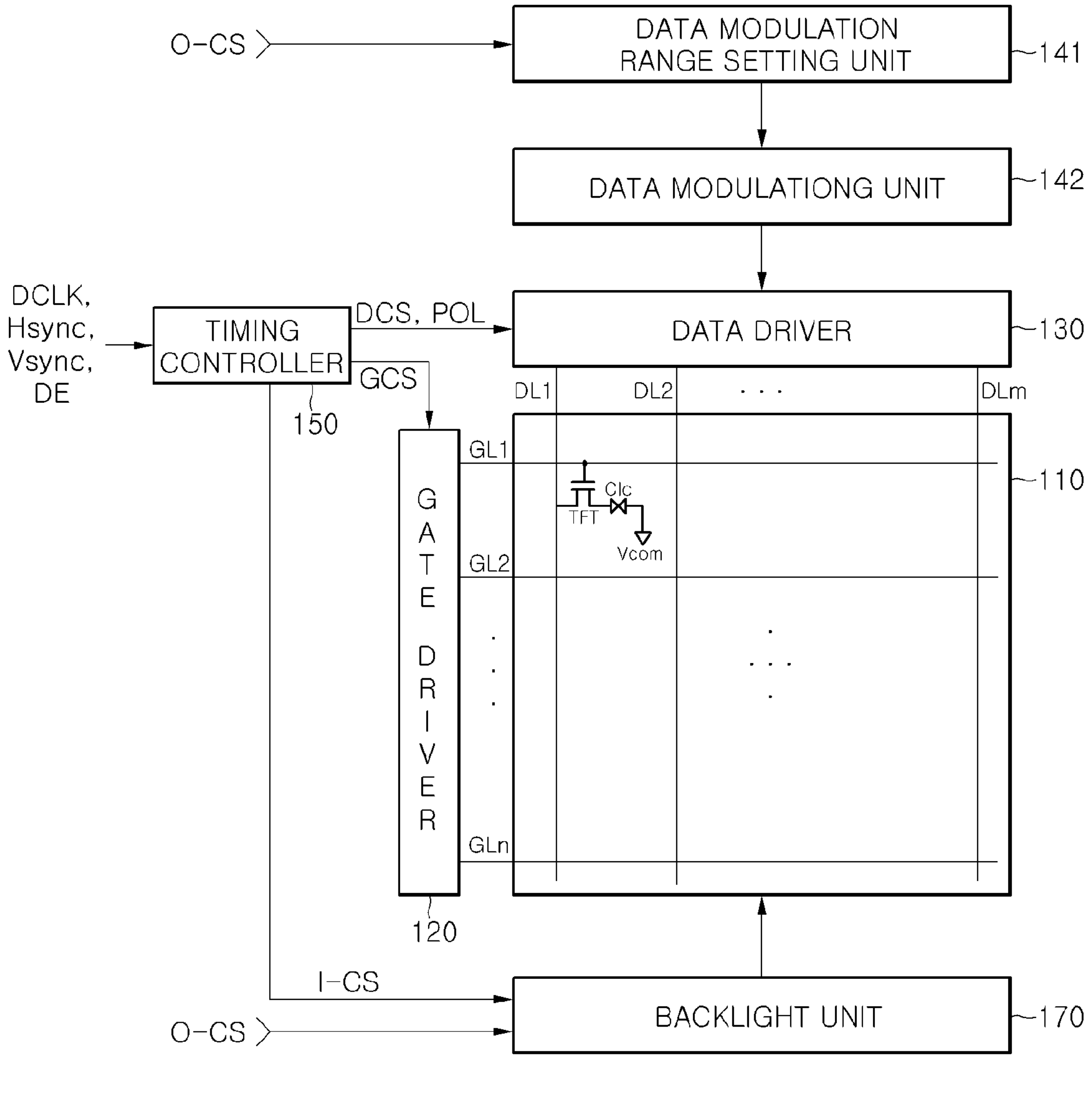
FIG. 1 is a schematic view showing an LCD device according to an embodiment of the present disclosure.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

In the present disclosure, an LCD device will now be described by way of example only.

Figure 2:
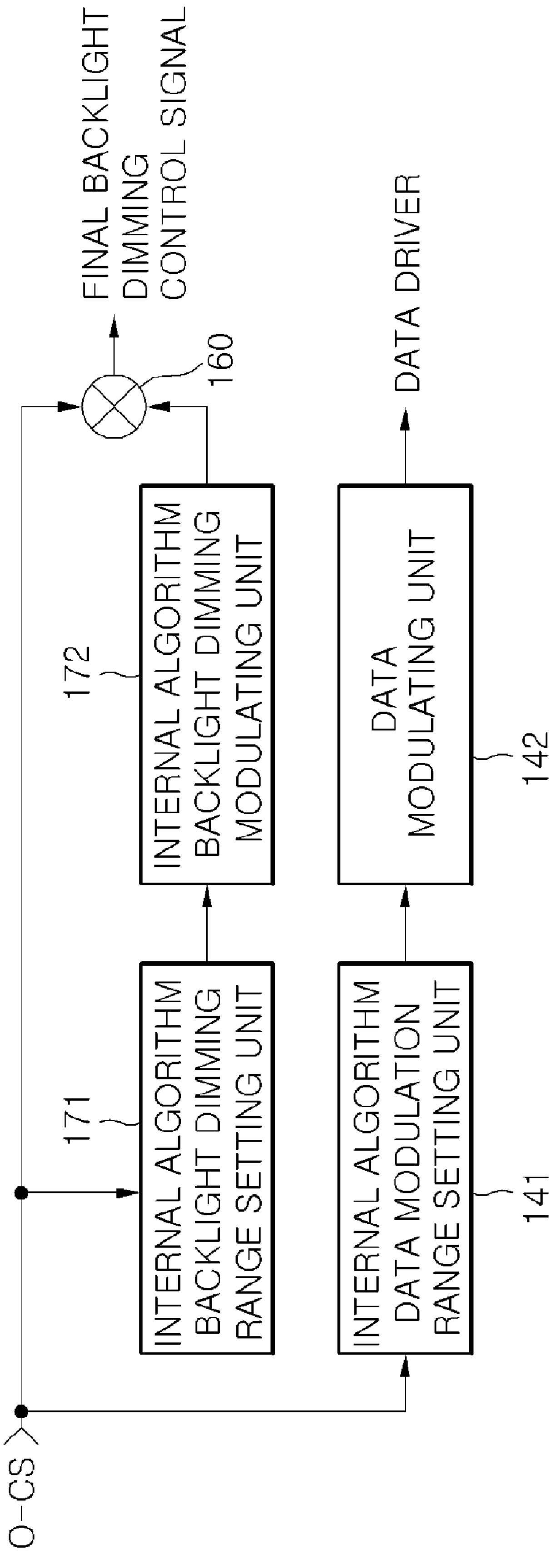
FIG. 2 is a view showing backlight dimming modulation and data modulation according to an embodiment of the present disclosure.

FIG. 1 is a schematic view showing an LCD device according to an embodiment of the present disclosure. FIG. 2 is a view showing backlight dimming modulation and data modulation according to an embodiment of the present disclosure.

Referring to FIGS. 1 and 2, an LCD according to an embodiment of the present disclosure includes a liquid crystal display panel 110 with gate lines GL1~GLn and data lines DL1~DLm intersecting each other and a thin film transistor (TFT) driving a liquid crystal cell Clc formed at intersection of the gate lines GL1~GLn and the data lines DL1~DLn, a data driver 130 providing a data signal to the data lines DL1~DLm of the liquid crystal display panel 110, a gate driver 120 providing a scan signal to the gate lines GL1~GLn of the liquid crystal display panel 110, a timing controller 150 controlling the data driver 120 and the data driver 130, and a backlight unit 170 providing light to the liquid crystal display panel 110.

The TFT is formed on the liquid crystal display panel 110 such that every liquid cell dutycycles as a switching device. A gate electrode of the TFT is coupled with the gate lines GL1~GLn, a source electrode thereof is coupled with the data lines DL1~DLm, and a drain electrode thereof is coupled with a pixel electrode of the liquid crystal cell Clc and one electrode of a storage capacitor Cst. A common voltage Vcom is provided to a common electrode of the liquid crystal cell Clc. When the TFT is turned-on, the storage capacitor Cst charges a data voltage provided from the data lines DL1~DLn to maintain a constant voltage of the liquid crystal cell Clc.

When a scan pulse is sequentially provided to the gate lines GL1~GLn, the TFT is turned-on so that a channel is formed between a source electrode and a drain electrode to provide a voltage of the data lines DL1~DLm to the pixel electrode of the liquid crystal cell Clc. At this time, an arrangement of liquid crystal molecules in the liquid crystal cell Clc changes to modulate incident light.

The gate driver 120 sequentially generates a scan pulse according to a gate drive control signal GCS provided from the timing controller 150, and provides the generated scan pulse to the gate lines GL1~GLn. The scan pulse causes the gate lines GL1~GLn to be enabled in units of one horizontal synchronization signal interval.

In this case, the gate drive control signal GCS provided from the timing controller 150 includes GSP, GSC, GOE, and the like.

The data driver 130 provides a data signal to the data lines DL1~DLm in response to a data drive control signal DCS provided from the timing controller 150. Further, the data driver 130 samples and latches image data R, G, and B input from the timing controller 150. Next, the data driver 130 converts the image data R, G, and B into an analog data voltage capable of expressing gradation in the liquid crystal cell Clc of the liquid crystal display panel 110 based on a gamma reference voltage provided from a gamma voltage generator (not shown), and provides them to the data lines DL1~DLm.

In this case, the data drive control signal DCS provided from the timing controller 150 includes SSP, SSC, SOE, POL, and the like.

The timing controller 150 generates a gate control signal GCS and a data control signal DCS using a data clock signal DCLK, a horizontal synchronization signal Hsync, a vertical synchronization signal Vsync, a data enable signal DE, and a polarity inversion signal POL provided from an external device (e.g. the graphic module of a computer system or the image demodulation module of a television receiving system), which is not shown.

The backlight unit 170 drives a light source using an internal algorithm backlight dimming control signal I-CS and an external backlight dimming control signal O-CS provided from the timing controller 150.

The backlight unit 170 modulates the internal algorithm backlight dimming control signal I-CS according to an external backlight dimming control signal O-CS, and drives the light source using the modulated backlight dimming control signal MI-CS and the external backlight dimming control signal O-CS.

In other words, the backlight unit 170 of the present disclosure includes an internal algorithm backlight dimming modulating unit 172, which modulates an internal algorithm backlight dimming control signal I-CS using the external backlight dimming control signal O-CS, and an internal algorithm backlight dimming range setting unit 171 setting an internal backlight dimming range using the external backlight dimming control signal O-CS.

The internal algorithm backlight dimming range setting unit 171 performs a dutycycle setting the modulation range of an internal backlight dimming dutycycle according to the dimming dutycycle of the external backlight dimming control signal O-CS in order to prevent the internal backlight dimming range from being set below an allowable dimming range (generally 30%) of a final backlight dimming control signal.

$$\text{Minimum internal } algorithmbacklightdimming \text{ duty} = \frac{minimumbacklightallowablerange \text{ duty}}{externalbacklightdimming \text{ duty}} \times 100 \quad \text{[Equation 1]}$$

The internal algorithm backlight dimming range setting unit 171 calculates a minimum internal algorithm backlight dimming dutycycle using equation 1.

The internal algorithm backlight dimming modulating unit 172 modulates an internal algorithm backlight dimming dutycycle based on the minimum internal algorithm backlight dimming duty calculated by the internal algorithm backlight dimming range setting unit 171 to output an internal algorithm backlight dimming modulation signal MI-CS.

An internal algorithm backlight dimming modulation signal MI-CS from the internal algorithm backlight dimming modulating unit 172 is input to an arithmetic unit 160. In this case, the external backlight dimming control signal O-CS is input to the arithmetic unit 160.

The arithmetic unit 160 performs multiplication to generate a final backlight dimming control signal driving a light source of the backlight unit 170.

A method for generating the final backlight dimming control signal in order to drive a light source of the backlight unit 170 according to an embodiment of the present disclosure will now be described.

Assuming that an allowable dimming range of the backlight unit 170 is from 30% to 100%, when an external backlight dimming duty is 60%, the internal backlight dimming duty may be set to a range from 50% to 100%. That is, a final backlight dimming duty output from the arithmetic unit 160 ranges from 30% to 60% in order to maintain the allowable dimming range.

In this case, the LCD device according to the present disclosure further includes a data modulating unit 142 which modulates image data using an external backlight dimming control signal O-CS as well as an internal algorithm data modulation range setting unit 141 which sets the modulation range for the image data modulated by the data modulating unit 142.

When the internal algorithm backlight dimming dutycycle being modulated is to be reduced or increased, the data modulating unit 142 dutycycles to modulate and compensate the image data. Namely, when the internal algorithm backlight dimming dutycycle is reduced, the data modulating unit 142 modulates the image to a gradation higher than an internal algorithm gradation, thereby preventing deterioration in the image quality. Furthermore, when the internal algorithm backlight dimming dutycycle is increased, the data modulating unit 142 modulates the image to a gradation lower than an internal algorithm gradation, thereby preventing deterioration in the image quality.

The internal algorithm data modulation range setting unit 141 sets a range setting for the image data according to an internal backlight dimming modulation range using the external backlight dimming control signal O-CS. The data modulating unit 142 modulates the image data according to the set data modulation range from the internal algorithm data modulation range setting unit 141.

In the case that the image data are modulated, when a dimming dutycycle of the external backlight dimming control signal O-CS changes, a data modulation range of the internal algorithm data modulation range setting unit 141 also changes, thereby compensating for an image with a change of a final backlight dimming dutycycle.

In the LCD device according to an embodiment of the present disclosure as described above an internal algorithm backlight dimming dutycycle is modulated according to an external backlight dimming control signal O-CS and image data are also modulated. This is to prevent the dimming range of the backlight unit 170 from being set below a certain level (generally 30% or more than the dimming dutycycle), which deteriorates the reliability of the backlight unit 170. Thus in the LCD device according to an embodiment of the present disclosure, an image of the same quality as the related art is displayed, and the deterioration of the backlight unit is prevented.

The present disclosure has been limitedly described regarding only an LCD device as a display device. However, the present disclosure is not limited thereto. It is applicable to a variety of flat panel display devices with a backlight unit.

As described above, in the LCD device according to an embodiment of the present disclosure, an internal algorithm backlight dimming dutycycle is modulated according to an external backlight dimming control signal O-CS and image data are also modulated, thereby displaying an image of the same quality as the related art. Therefore, the LCD device can prevent the reliability deterioration in the backlight unit. To rectifying this, the LCD device forces a dimming range of the backlight unit not to be set below an allowable range thereof (generally, 30% or more of a dimming dutycycle), in order to prevent the reliability deterioration in the backlight unit.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents.

What is claimed is:

1. A liquid crystal display device comprising:

a backlight dimming modulating unit configured to modulate an internal algorithm backlight dimming control signal using an external input algorithm backlight dimming control signal and to maintain a dimming duty cycle equal to or wider than an allowable dimming range of a backlight unit;

an arithmetic unit configured to multiply the external input algorithm backlight dimming control signal by the modulated internal algorithm backlight dimming control signal and to output a final backlight dimming control signal; and a data modulating unit configured to modulate image data using the external input algorithm backlight dimming control signal corresponding to the modulated final backlight dimming control signal; and an internal algorithm backlight dimming range setting unit configured to set a modulation range of the backlight dimming modulating unit, wherein the internal algorithm backlight range setting unit calculates a minimum internal algorithm backlight dimming duty using a minimum backlight allowable range duty and external backlight dimming duty.

2. The liquid crystal display device claimed as claim 1, wherein the minimum internal algorithm backlight dimming duty uses a follow equation:

minimum internal algorithm backlight dimming duty=(minimum backlight allowable range duty/external backlight dimming duty)×100.

3. The liquid crystal display device claimed as claim 1, further comprising an internal algorithm data modulation range setting unit configured to set a modulation range of the image data.

* * * * *